United States Patent
Sharma et al.

(10) Patent No.: US 9,026,503 B2
(45) Date of Patent: May 5, 2015

(54) FRAGMENTATION CONTROL FOR PERFORMING DEDUPLICATION OPERATIONS

(75) Inventors: Alok Sharma, Bangalore (IN); Sunil Walwaiker, Bangalore (IN); Vaijayanti Bharadwaj, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 391 days.

(21) Appl. No.: 13/408,051

(22) Filed: Feb. 29, 2012

(65) Prior Publication Data
US 2013/0226881 A1    Aug. 29, 2013

(51) Int. Cl.
*G06F 17/30* (2006.01)

(52) U.S. Cl.
CPC ................. *G06F 17/30156* (2013.01)

(58) Field of Classification Search
USPC ........................................................ 707/692
See application file for complete search history.

(56) References Cited

U.S. PATENT DOCUMENTS

| | | | |
|---|---|---|---|
| 2008/0077762 A1 | 3/2008 | Scott et al. | |
| 2009/0271402 A1* | 10/2009 | Srinivasan et al. | 707/6 |
| 2011/0055471 A1 | 3/2011 | Thatcher et al. | |
| 2011/0271033 A1 | 11/2011 | Williams | |
| 2012/0036113 A1 | 2/2012 | Lillibridge | |
| 2012/0151169 A1* | 6/2012 | Mori et al. | 711/166 |
| 2013/0091102 A1* | 4/2013 | Nayak | 707/692 |
| 2013/0198148 A1* | 8/2013 | Chambliss et al. | 707/692 |

FOREIGN PATENT DOCUMENTS

KR    1020120016747 A    2/2012

OTHER PUBLICATIONS

International Search Report and Written Opinion to International Application No. PCT/US2013/027673, dated Jun. 19, 2013 (11 pages).

* cited by examiner

*Primary Examiner* — Amresh Singh
(74) *Attorney, Agent, or Firm* — Perkins Coie LLP

(57) ABSTRACT

The techniques introduced here provide for enabling deduplication operations for a file system without significantly affecting read performance of the file system due to fragmentation of the data sets in the file system. The techniques include determining, by a storage server that hosts the file system, a level of fragmentation that would be introduced to a data set stored in the file system as a result of performing a deduplication operation on the data set. The storage server then compares the level of fragmentation with a threshold value and determines whether to perform the deduplication operation based on a result of comparing the level of fragmentation with the threshold value. The threshold value represents an acceptable level of fragmentation in the data sets of the file system.

22 Claims, 8 Drawing Sheets though the additional storage gained by deduplication may be desirable, the fragmentation introduced into the data sets can result in reduced performance due to the increased number of read operations needed to access the data. The techniques described here allow the deduplication operations to be controlled so that the balance between the storage gained by performing deduplication and the reduced performance associated with reading a fragmented data set is maintained. The techniques include determining the level of fragmentation that would be introduced to a data set by performing deduplication on the data set. If the level of fragmentation introduced to the data set exceeds a threshold level, the deduplication operation is not performed.

FRAGMENTATION CONTROL FOR PERFORMING DEDUPLICATION OPERATIONS

FIELD OF THE INVENTION

At least one embodiment of the present invention pertains to deduplication of data stored by a storage server, and more particularly to controlling the level of fragmentation introduced to a data set in the process of deduplication.

BACKGROUND

A storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory.

Mass storage devices provide a series of addressable locations in which data can be stored. Some devices, such as tape drives, only permit storage locations to be accessed in sequential order, while other devices, such as hard disks or flash, permit random access. Mass storage devices may be combined to give the impression to higher layers of a single device with certain desirable characteristics. For example, a Redundant Array of Independent Disks ("RAID array") may contain two or more hard disks with data spread among them to obtain increased transfer speed, improved fault tolerance or simply increased storage capacity. The placement of data (and calculation and storage of error detection and correction information) on various devices in a RAID array may be managed by hardware and/or software.

Many contemporary data processing systems consume and/or produce vast quantities of data. Mass storage devices such as hard disk drives are often used to store this data. To keep up with the amount of data consumed and produced by these processing systems, either the storage capacity of mass storage devices and/or the efficiency of the usage of space on the mass storage devices can be increased. One method for increasing the efficiency of the usage of space on a mass storage device is to perform a deduplication operation which eliminates redundant data stored on a mass storage device.

However, deduplication often introduces fragmentation into a data set that was previously stored as contiguous blocks on disk. Each addressable storage location can usually hold multiple data bytes; such a location is called a "block." When the data blocks of a data set are separated and/or stored out of read order, the data set is said to be "fragmented." A process that reads the fragmented data set might cause the storage system to perform multiple read operations to obtain the contents of the data blocks corresponding to the data set. The mechanical nature of many types of mass storage devices limits their speed to a fraction of the system's potential processing speed, particularly when a data set is fragmented and requires multiple read operations to retrieve the data set. Because fragmentation caused by deduplication can negatively impact storage system performance, many storage system users disable deduplication operations and therefore do not benefit from the space saving advantages of deduplication.

Therefore, a technique to balance the effects of fragmentation introduced during deduplication operations and the storage system performance desired by users is needed.

SUMMARY

The techniques introduced here enable deduplication operations for a file system without significantly affecting read performance of the file system due to fragmentation of the data sets in the file system. In one embodiment, a storage server that hosts the file system determines a level of fragmentation that would be introduced to a data set stored in the file system as a result of performing a deduplication operation on the data set. The storage server then compares the level of fragmentation with a threshold value and determines whether to perform the deduplication operation based on a result of the comparison. The threshold value represents an acceptable level of fragmentation in the data sets of the file system.

In one embodiment, the level of fragmentation of a data set stored in a file system is determined by performing a read-ahead to count the number of read operations to access the data set after performing a deduplication operation on the data set, and calculating a fragmentation index that is a ratio of the number of read operations after deduplication to the number of read operations to access an ideal data set. An ideal data set is one that is stored in contiguous physical data blocks and can be accessed with the lowest number of read operations. The fragmentation index is an indication of the increase in fragmentation due to the deduplication operation.

The storage server can calculate the number of read operations to access the data set after performing the deduplication operation by determining a list of physical volume block numbers (PVBNs) that would represent the data set after a deduplication operation has been performed, sorting the list of PVBNs, and counting the number of contiguous groups of blocks.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
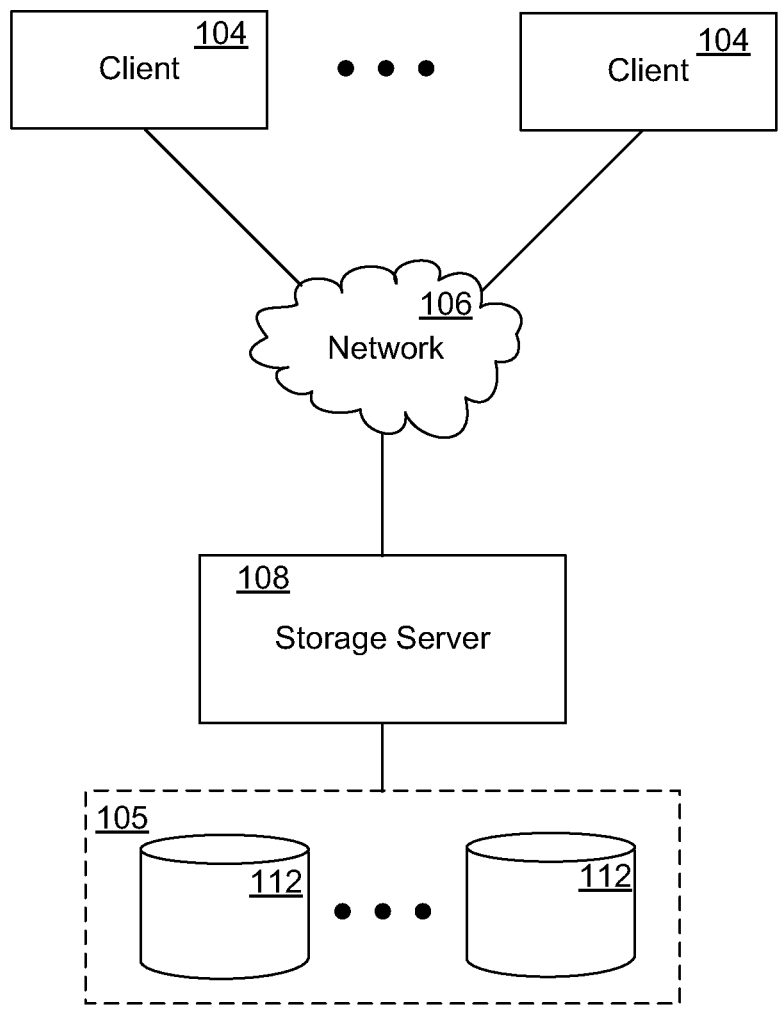
FIG. 1 shows an example of a network storage system.

FIG. 1 shows an example of a network storage system, which includes a plurality of client systems 104, a storage server 108, and a network 106 connecting the client servers 104 and the storage server 108. As shown in FIG. 1, the storage server 108 is coupled with a number of mass storage devices 112, such as disks, in a mass storage subsystem 105. Alternatively, some or all of the mass storage devices 112 can be other types of storage, such as flash memory, solid-state drives (SSDs), tape storage, etc. However, to facilitate description, the storage devices 112 are assumed to be disks herein.

The storage server 108 can be, for example, one of the FAS-series of storage server products available from NetApp®, Inc. The client systems 104 are connected to the storage server 108 via the network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). Storage of information in the mass storage subsystem 105 can be implemented as one or more storage volumes that comprise a collection of physical storage disks 112 cooperating to define an overall logical arrangement of volume block number (VBN) space on the volume(s). Each volume is generally, although not necessarily, associated with its own file system.

The disks associated with a volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used according to the techniques described herein. One or more RAID groups together form an aggregate. An aggregate can contain one or more volumes.

Figure 2:
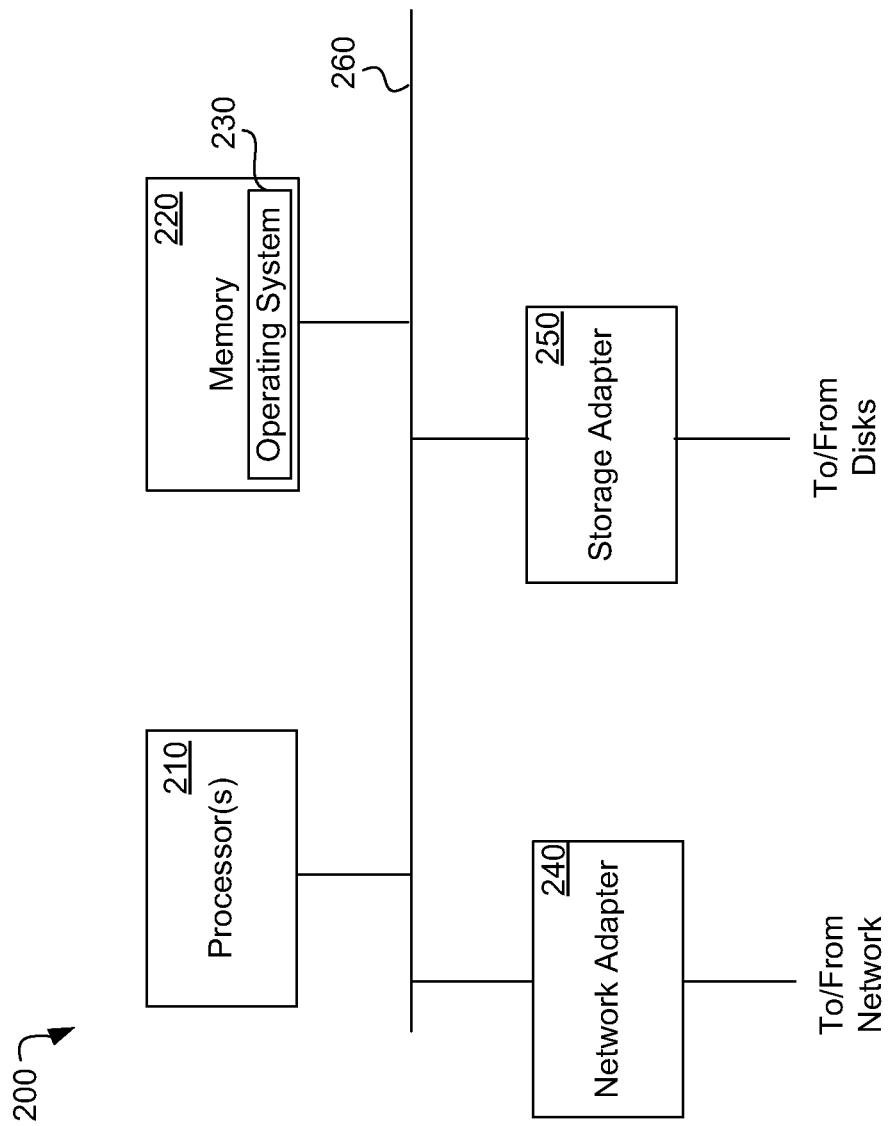
FIG. 2 is a diagram illustrating an example of a storage controller that can implement one or more network storage servers.

FIG. 2 is a diagram illustrating an example of the hardware architecture of a storage controller that can implement one or more network storage servers, for example, storage server 108 of FIG. 1. The storage server is a processing system that provides storage services relating to the storage, organization, and retrieval of information on mass storage devices, such as disks 112 of the mass storage subsystem 105. In an illustrative embodiment, the storage server 108 includes a processor subsystem 210 that includes one or more processors. The storage server 108 further includes a memory 220, a network adapter 240, and a storage adapter 250, all interconnected by an interconnect 260.

The storage server 108 can be embodied as a single- or multi-processor storage server executing a storage operating system 230 that preferably implements a high-level module, called a storage manager, to logically organize data in one or more file systems on the disks 112.

The memory 220 illustratively comprises storage locations that are addressable by the processor(s) 210 and adapters 240 and 250 for storing software program code and data associated with the techniques introduced here. The processor 210 and adapters may, in turn, comprise processing elements and/or logic circuitry configured to execute the software code and manipulate the data structures. The storage operating system 230, portions of which are typically resident in memory and executed by the processing elements, functionally organizes the storage server 108 by (among other things) invoking storage operations in support of the storage service provided by the storage server 108. It will be apparent to those skilled in the art that other processing and memory implementations, including various computer readable storage media, may be used for storing and executing program instructions pertaining to the techniques introduced here.

The network adapter 240 includes a plurality of ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network or a Fibre Channel network. Each client 104 can communicate with the storage server 108 over the network 106 by exchanging packets or frames of data according to pre-defined protocols, such as Transmission Control Protocol/Internet Protocol (TCP/IP).

The storage adapter 250 cooperates with the storage operating system 230 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes a plurality of ports having input/output (I/O) interface circuitry that couples with the disks over an I/O interconnect arrangement, such as a conventional high-performance, Fibre Channel link topology.

The storage operating system 230 facilitates client access to data stored on the disks 112. In certain embodiments, the storage operating system 230 implements a write-anywhere file system that cooperates with one or more virtualization modules to "virtualize" the storage space provided by disks 112. In certain embodiments, a storage manager 310 (FIG. 3) element of the storage operation system 230 logically organizes the information as a hierarchical structure of named directories and files on the disks 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical unit numbers (LUNs).

Figure 3:
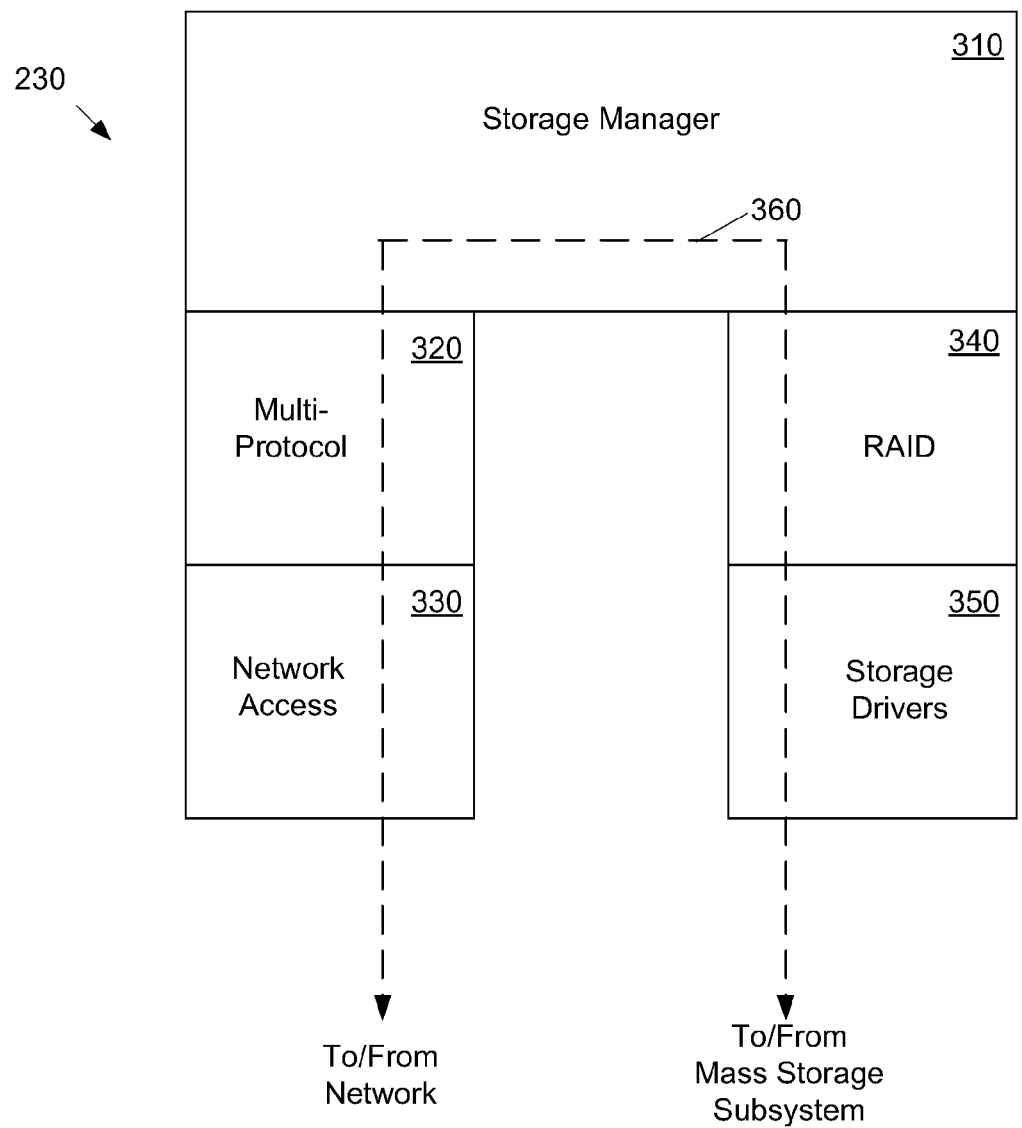
FIG. 3 schematically illustrates an example of the architecture of a storage operating system in a storage server.

FIG. 3 schematically illustrates an example of the architecture of a storage operating system 230 for use in a storage server 108. In one embodiment, the storage operating system 230 can be the NetApp® Data ONTAP™ operating system available from NetApp, Inc., Sunnyvale, Calif. that implements a Write Anywhere File Layout (WAFL™) file system. However, another storage operating system may alternatively be designed or enhanced for use in accordance with the techniques described herein.

The storage operating system 230 can be implemented as programmable circuitry programmed with software and/or firmware, or as specially designed non-programmable circuitry (i.e., hardware), or in a combination thereof. In the illustrated embodiment, the storage operating system 230 includes several modules, or layers. These layers include a storage manager 310, which is the core functional element of the storage operating system 230. The storage manager 310 imposes a structure (e.g., one or more file systems) on the data managed by the storage server 108 and services read and write requests from clients 104.

To allow the storage server to communicate over the network 106 (e.g., with clients 104), the storage operating system 230 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), Internet small computer system interface (iSCSI), and/or backup/mirroring protocols to make data stored on the disks 112 available to users and/or application programs. The network access layer 330 includes one or more network drivers that implement one or more lower-level protocols to communicate over the network, such as Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105), the storage operating system 230 includes a storage access layer 340 and an associated storage driver layer 350 logically under the storage manager 310. The storage access layer 340 implements a higher-level storage redundancy algorithm, such as RAID-4, RAID-5 or RAID DP®. The storage driver layer 350 implements a lower-level storage device access protocol, such as Fibre Channel Protocol or small computer system interface (SCSI).

Also shown in FIG. 3 is the path 360 of data flow through the storage operating system 230, associated with a read or write operation, from the client interface to the storage interface. Thus, the storage manager 310 accesses the storage subsystem 105 through the storage access layer 340 and the storage driver layer 350. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets by using file-based access protocols, such as CIFS or NFS, over TCP/IP when accessing information in the form of files and directories. Alternatively, the clients may issue packets by using block-based access protocols, such as iSCSI and SCSI, when accessing information in the form of blocks.

In one embodiment, the storage manager 310 implements a message-based file system that provides logical volume management capabilities for use in access to the information stored on the storage devices, such as disks 112. That is, in addition to providing file system semantics, the storage manager 310 provides additional storage efficiency functions such as deduplication and compression operations. The storage manager 310 can implement the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file.

Operationally, a request from the client 104 is forwarded as a packet over the computer network 106 and onto the storage server 108 where it is received at the network adapter 240. A network driver (of layer 330) processes the packet and, if appropriate, passes it on to a multi-protocol access layer for additional processing prior to forwarding to the storage manager 310. Here, the storage manager generates operations to load (retrieve) the requested data from disk 112. The storage manager then passes a message structure including the file inode to the RAID system 340; the file inode is mapped to a disk identifier and disk block numbers and sent to an appropriate driver (e.g., a SCSI driver) of the disk driver system 350. The disk driver accesses the disk block numbers from the specified disk 112 and loads the requested data block(s) in memory 220 for processing by the storage server. Upon completion of the request, the storage server (and operating system) returns a reply to the client 104 over the network 106.

While depicted in FIG. 3 as a single unit, the storage operating system 230 can have a distributed architecture. For example, the multi-protocol layer 320 and network access layer 330 can be contained in an N-module (e.g., N-blade) while the storage manager 310, storage access layer 340 and storage driver layer 350 are contained in a separate D-module (e.g., D-blade). In such cases, the N-module and D-module (not shown) communicate with each other (and, possibly, with other N- and D-modules) through some form of physical interconnect and collectively form a storage server node. Such a storage server node may be connected with one or more other storage server nodes to form a highly scalable storage server cluster.

Figure 4A:
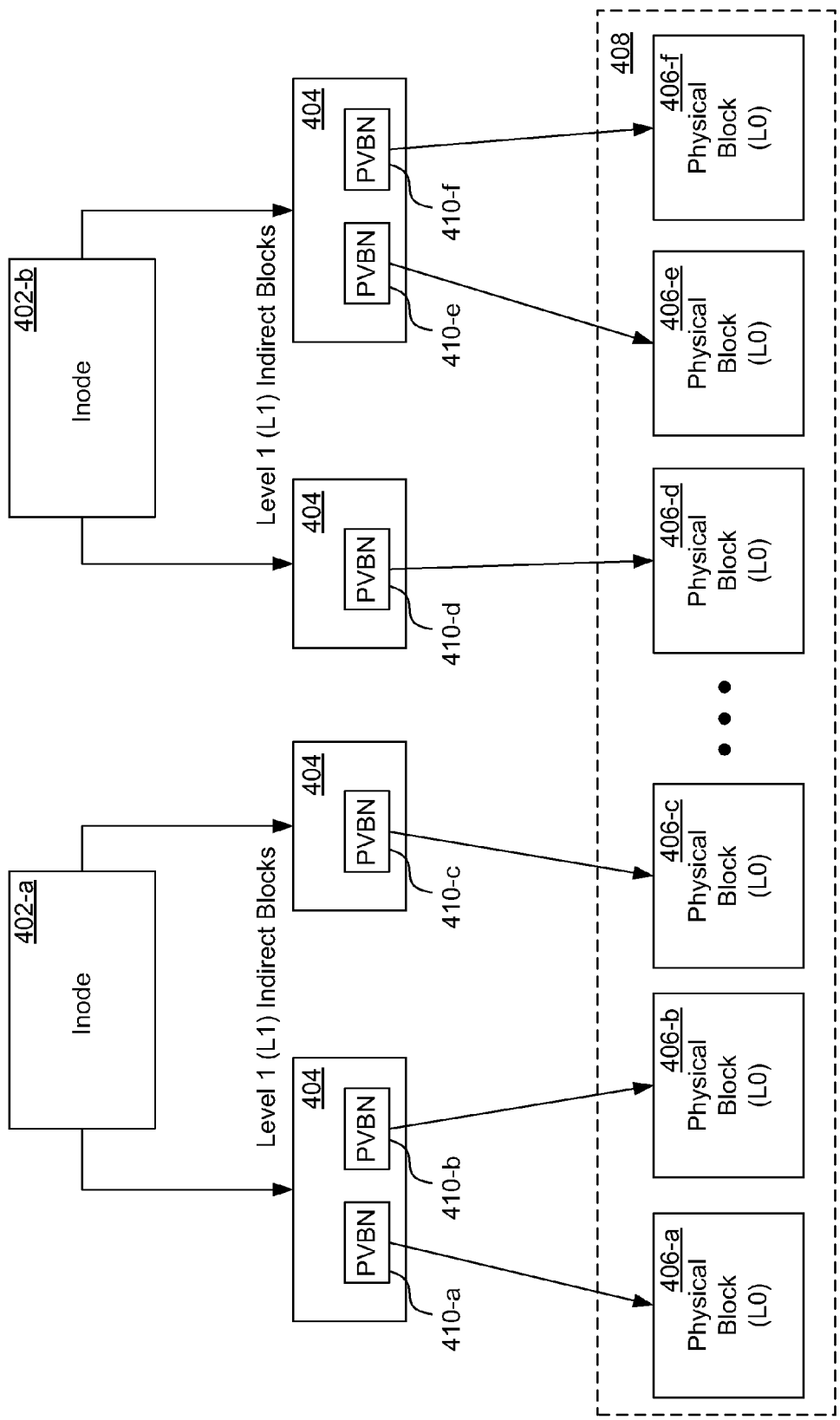
FIG. 4A is a block diagram representation of buffer trees for files in a file system.

FIG. 4A is a block diagram representation of buffer trees for files in a file system. Each file in the file system is assigned an inode. FIG. 4A, for example, includes two files represented by inodes 402-a and 402-b, stored in the file system. Each inode 402 references, for example using a pointer, Level 1 (L1) indirect blocks 404. Each indirect block 404 stores at least one physical volume block number (PVBN) 410. Each PVBN 410 references, for example using a pointer, a physical block 406 in a mass storage device 408. As shown in FIG. 4A, each PVBN 410 references a unique physical block 406. For example, PVBN 410-b references physical block 406-b. Note that there may be additional levels of indirect blocks (e.g., level 2, level 3) depending upon the size and layout of the file.

Figure 4B:
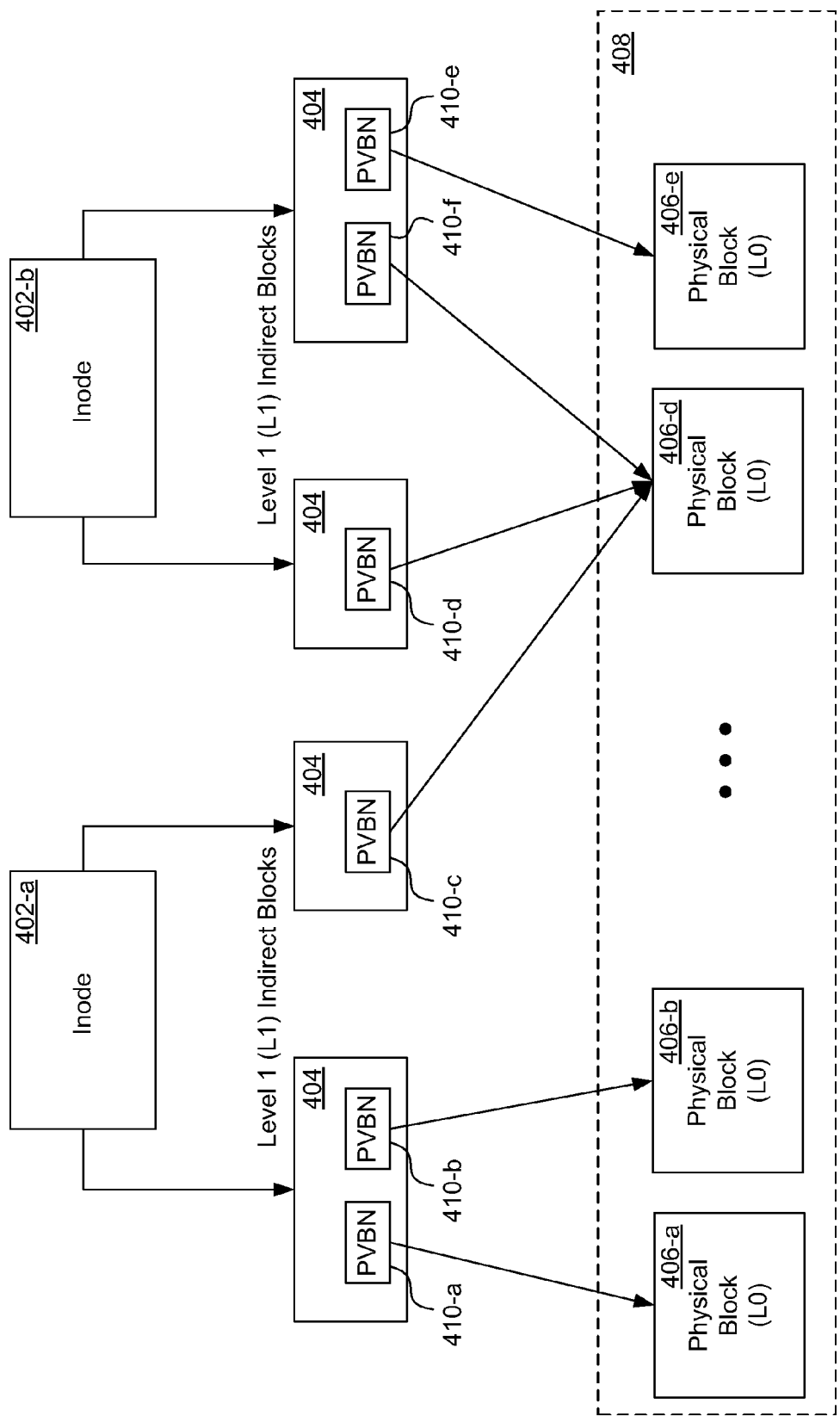
FIG. 4B is a block diagram representation of buffer trees for files in a file system after a deduplication process has been performed on the file system.

FIG. 4B is a block diagram representation of buffer trees for files in a file system after a deduplication process has been performed on the file system. The files represented in FIG. 4B correspond to those from FIG. 4A. The deduplication operation, as briefly described above, eliminates redundant data within the file system to make space for additional data to be stored. Essentially, deduplication removes duplicate blocks, storing only unique blocks in the file system, and creates a small amount of additional metadata in the process. This additional metadata is used by the storage manager 310 to locate the data in response to a request. In one embodiment, the metadata includes a hash value (e.g., based on SHA-256) or "fingerprint" value for every block within the file system. During the deduplication process the hash value for a data block is compared against other hash values of blocks stored in the file system and if a match is found (i.e., the blocks are identical) the redundant data is eliminated by sharing one of the physical blocks between two or more indirect blocks.

Consider the files of FIG. 4A represented by inodes 402-*a* and 402-*b* for example, if the data blocks 410-*c*, 410-*d*, and 410-*f* are determined to be identical after a comparison of their hash values, one block can be shared after deduplication instead of maintaining three blocks on disk. This block sharing is represented in FIG. 4B. In the example of FIG. 4B, PVBN 410-*d* is designated as the donor and PVBNs 410-*c* and 410-*f* are designated as the recipients. The underlying physical blocks that are no longer referenced by the recipient PVBNs (i.e., blocks 406-*c* and 406-*f*) are released and can be used by the storage manager 310 to store additional data.

Deduplication operations often introduce fragmentation into a file system. As shown in FIG. 4A, the storage manager 310 allocates blocks to files in a sequential manner (i.e., 406-*a*, 406-*b*, 406-*c*) to improve the read performance of the storage system. When the blocks of a file are contiguous, the file can be accessed by a single read operation without requiring relatively time consuming seek operations to locate file blocks. This sequential layout of blocks is broken, as shown in FIG. 4B, when deduplication operations share a block of data that is non-contiguous with the rest of the file. Because the inode 402-*a* references blocks that are fragmented (i.e., non-contiguous blocks 406-*a*, 406-*b*, and 406-*d*), multiple read operations must be performed to access the entire file.

There is a point where the space saving benefits of deduplication are outweighed by performance considerations of the storage system, for example, when a file becomes so fragmented from deduplication that reading the file results in a noticeable delay in retrieving the file. This poor read performance is not acceptable for storage systems that must frequently access data (e.g., primary storage systems). Thus, in order to control the fragmentation caused by deduplication without having to disable deduplication completely, the storage manager 310 can determine the degree to which read performance will be degraded prior to performing the deduplication and decide whether to perform the deduplication operation based on this determination.

In one embodiment, a user of the storage system (e.g., a storage administrator) can select the level of fragmentation that is acceptable for performing deduplication operations. For example, if the storage system is being used for secondary storage and the user knows that read/write access to the storage system is going to be infrequent, the user can set the deduplication operations for maximum space savings and potentially sacrifice read performance due to fragmentation. However, if the storage system is being used for primary storage and the user knows that read/write access to the storage system is going to be frequent, the user can set the deduplication operations for maximum performance and deduplication will only be performed if there is little or no impact on the read performance of the storage system due to fragmentation. Likewise, there can be intermediate settings that balance storage savings and performance at different levels.

Figure 5:
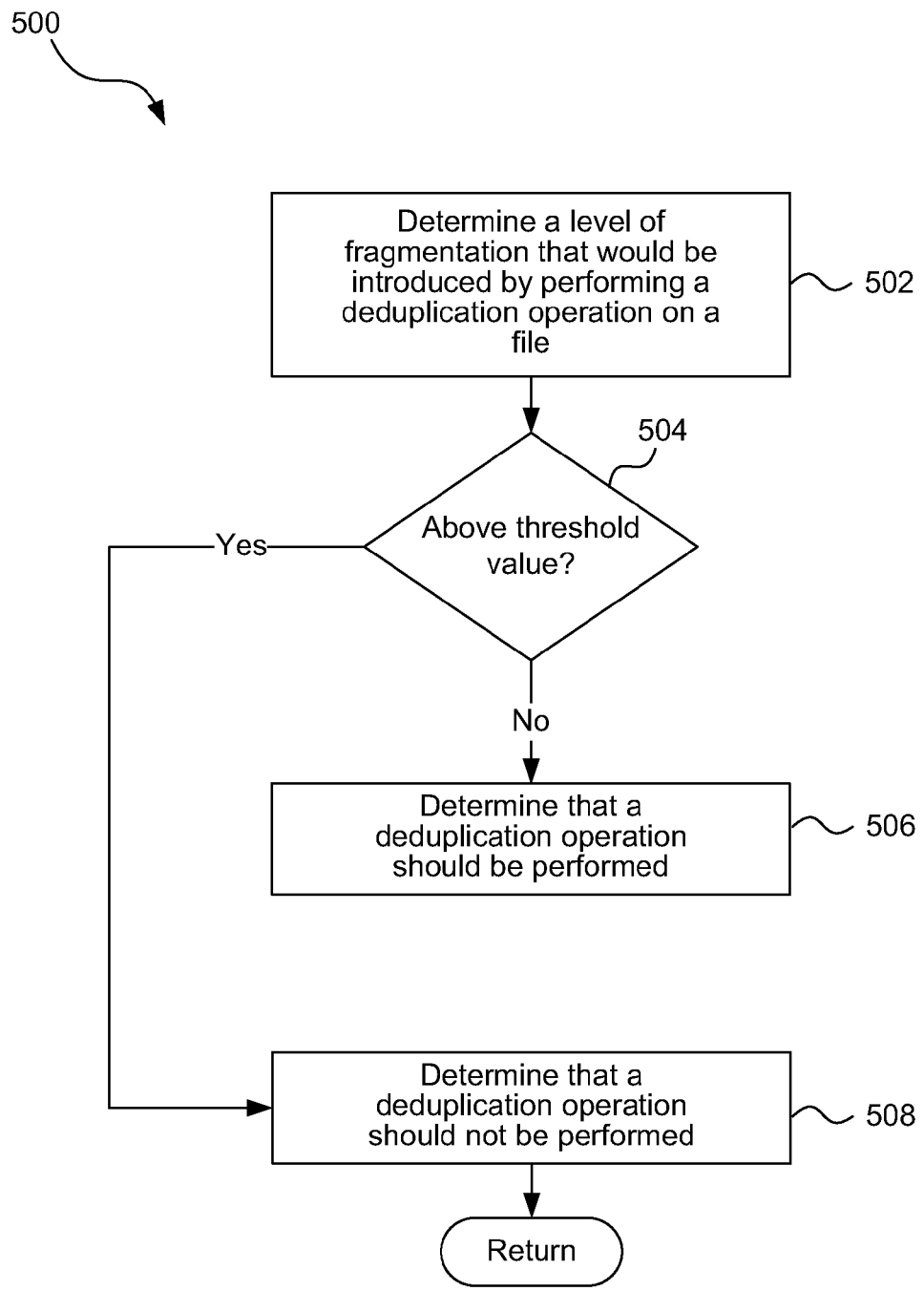
FIG. 5 is a flow diagram of a process for determining whether to perform a deduplication operation.

FIG. 5 is a flow diagram of a process for determining whether to perform a deduplication operation. The processes described herein are organized as a sequence of operations in the flowcharts. However, it should be understood that at least some of the operations associated with these processes potentially can be reordered, supplemented, or substituted for, while still performing the same overall technique.

The process 500 begins at step 502 where the storage manager 310 determines a level of fragmentation that would be introduced by performing a deduplication operation a file stored in the file system. The level of fragmentation is determined without having to actually perform the deduplication operation. The fragmentation level determined at step 502 is indicative of the read performance that can be expected if the deduplication operation were to be performed. Determining the level of fragmentation is described in more detail below with reference to FIG. 6 and FIG. 7.

At step 504, the level of fragmentation is compared to a threshold value by the storage manager 310. As described above, the threshold value can be determined by the user of the storage system and can depend on the intended use of the storage system. For example, the threshold for a storage system that is used as primary storage will be relatively low compared with the threshold for a storage system used for secondary or backup storage. In one embodiment, a relatively lower threshold value indicates that the storage system user is more sensitive to performance delays that may be related to fragmentation introduced by deduplication. Depending on how the fragmentation level is calculated, in some embodiments a favorable comparison may be found if the fragmentation level is below a given threshold value.

In the example of FIG. 5, if the fragmentation level of the file is determined to be above the threshold value, the process continues to step 508 where the storage manager 310 determines that the deduplication operation should not be performed. However, if the fragmentation level of the file is not above the threshold value, the process continues to step 506 where the storage manager 310 determines that the deduplication operation should be performed. The deduplication process itself is not germane to this disclosure and any known and suitable method of deduplication can be employed. The process of FIG. 5 is repeated for each file in the file system to determine whether to perform deduplication operations. The deduplication operations can be performed continuously or periodically.

Figure 6:
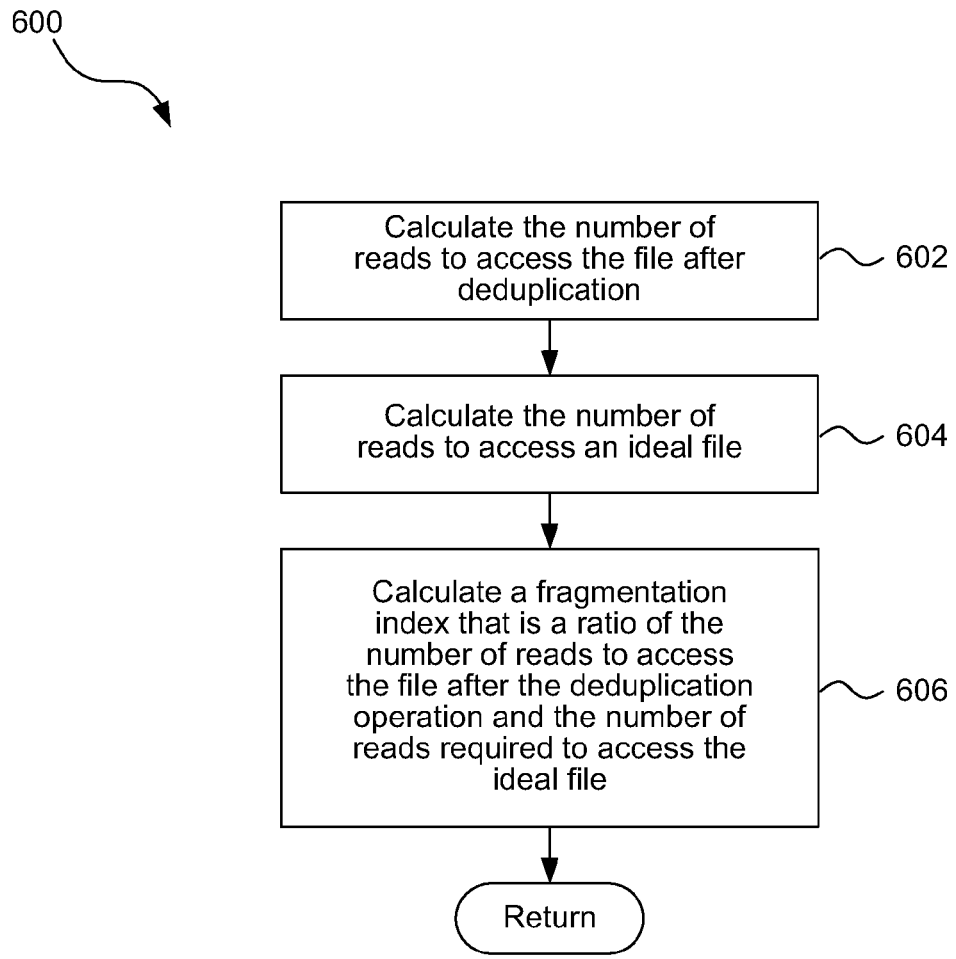
FIG. 6 is a flow diagram of a process for determining a level of fragmentation that would be introduced by performing a deduplication operation on a data set.

FIG. 6 is a flow diagram of a process for determining a level of fragmentation that would be introduced by performing a deduplication operation on a file. The process 600 is one example embodiment of step 502 of FIG. 5. The process begins at step 602 where the storage manager 310 calculates the number of read operations that would be needed to access the file after the deduplication operation has been performed. This process is described in more detail below with reference to FIG. 7.

At step 604, the storage manager 310 calculates the number of read operations that are needed to access an ideal file. An ideal file is one that is stored in contiguous physical data blocks and can be accessed with the lowest number of read operations. In one embodiment, the number of read operations that are needed to access the file can be determined by performing a read-ahead operation. The read-ahead operation fetches the blocks from the physical storage and stores the blocks into memory. The storage manager can use the number of read operations needed to perform the read-ahead operation as the number of read operations that are needed to access the file.

In one embodiment, the storage manager 310 allocates writes to the storage system in segments of up to 64 contiguous disk blocks, and read operations can be performed on sections of a disk up to 64 contiguous blocks. Thus, for an ideal file consisting of 256 contiguous disk blocks, for example, the storage manager 310 would perform four read operations to fetch the entire file. However, after fragmentation introduced by a deduplication operation, this same read-ahead may require a higher number of read operations.

At step 606, the storage manager 310 calculates the fragmentation index of the file after the deduplication operation. The fragmentation index is an indication of the fragmentation level of the file after deduplication relative to the fragmentation of the ideal file. Using the example of the ideal 256 block file from above, if the read-ahead for the ideal file takes four read operations because the file is contiguous and the read-ahead takes 16 read operations after deduplication because fragmentation has been introduced, the fragmentation index of the file would be 4. This fragmentation index can be compared to a threshold value, for example in step 504 of FIG. 5, and used to determine whether to perform the deduplication operation.

Figure 7:
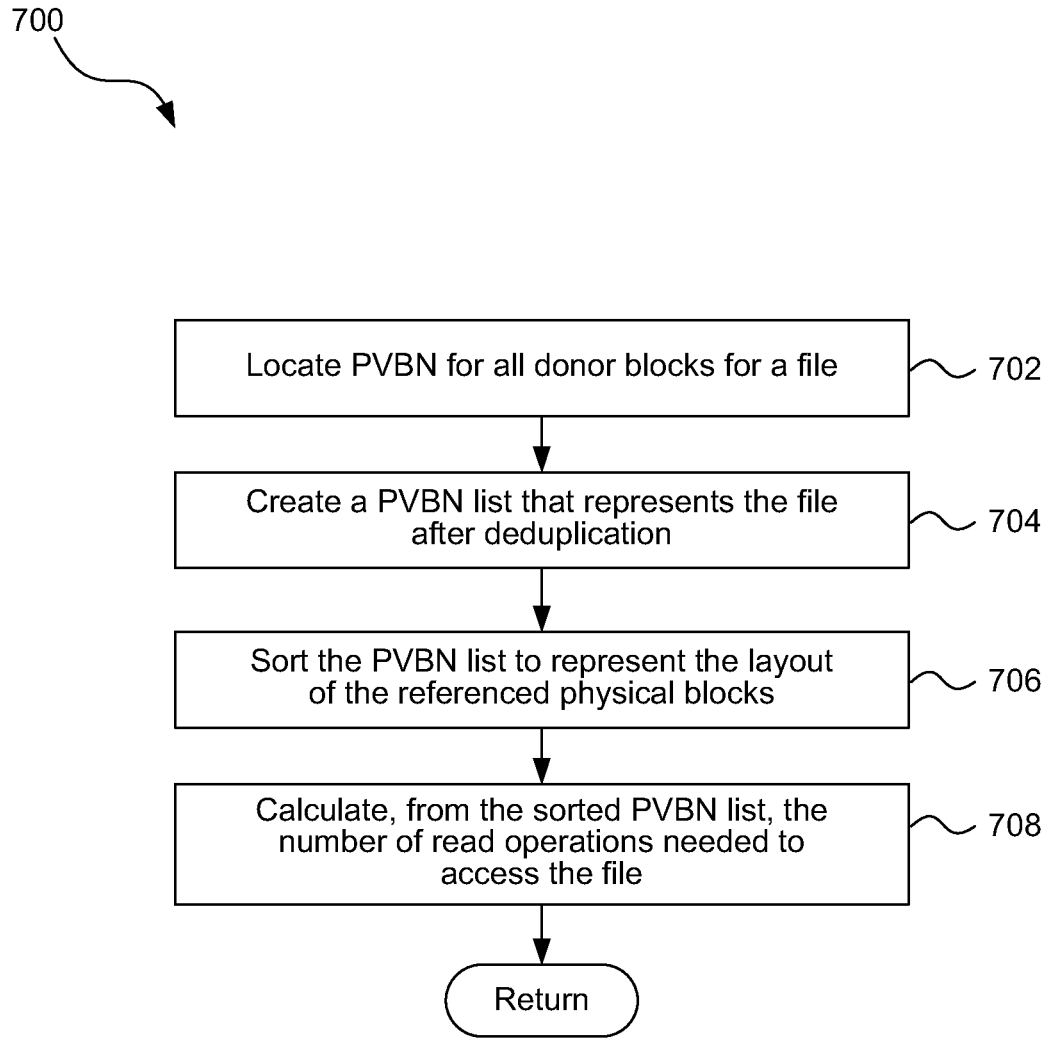
FIG. 7 is a flow diagram of a process for calculating, prior to performing a deduplication operation, the number of read operations to access the data set after deduplication.

FIG. 7 is a flow diagram of a process for calculating, prior to performing a deduplication operation, the number of read operations to access the file after deduplication. The process 700 is one example embodiment of step 602 of FIG. 6. At step 702, the storage manager 310 locates the PVBN for all of the donor blocks to be used in the deduplication operation. As described above, the storage system maintains a data structure with hash values or fingerprints for each block in the file system. In determining which blocks in a file can be replaced with donor blocks (typically called block "sharing"), the storage manager 310 compares the hash values for each block of the file with the stored hash values of the other files in the file system.

After the possible donor blocks have been located, at step 704, the storage manager 310 replaces each PVBN of the original file with the PVBN of its corresponding donor block in a list of PVBNs that represent the file, without actually associating the logical blocks of the file with the PVBNs. The storage manager then sorts the list of PVBNs, at step 706, to represent the layout of the blocks on the disk. From the sorted PVBN list, at step 708, the storage manager 310 can calculate the number of read operations needed to access the file after deduplication. In one embodiment, the storage manager 310 calculates the number of read operations by counting the groups of contiguous blocks in the PVBN list. For example, if there are sixteen groups of contiguous blocks, the storage manager 310 determines that sixteen read operations would be needed to access the file after deduplication.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
calculating, by a storage server, a level of fragmentation that would be introduced to a data set stored by the storage server as a result of a deduplication operation on the data set; and
determining, by the storage server, whether to perform the deduplication operation based on a result of said calculating, the determining including:
calculating a number of read operations needed to access the data set after the deduplication operation,
calculating a number of read operations needed to access an ideal data set, and
calculating a fragmentation index representative of the level of fragmentation based on the number of read operations needed to access the data set after the deduplication and the number of read operations needed to access the ideal data set, wherein determining whether to perform the deduplication operation is based on the fragmentation index.

2. The method of claim 1 further comprising, comparing, by the storage server, the level of fragmentation with a threshold value to determine whether to perform the deduplication operation.

3. The method of claim 2, wherein the threshold value represents a maximum acceptable level of fragmentation for the data set.

4. The method of claim 2 further comprising, performing the deduplication operation in response to determining that the level of fragmentation is below the threshold value.

5. The method of claim 2 further comprising, not performing the deduplication operation in response to determining that the level of fragmentation is above the threshold value.

6. The method of claim 2, wherein the threshold value is set based on user input.

7. The method of claim 1, wherein the fragmentation index is a ratio of the number of read operations to access the data set after the deduplication operation and the number of read operations needed to access the ideal data set.

8. The method of claim 1, wherein calculating the number of read operations needed to access the data set after the deduplication operation includes:
determining an address of a donor block for each of a plurality of blocks in the data set that are to be shared in the deduplication operation;
creating an address list that includes an address for each of the blocks of the data set after the deduplication operation;
sorting the addresses in the address list in the order they occur on a storage device;
calculating, from the address list, the number of read operations needed to access the data set after the deduplication operation.

9. A method comprising:
calculating, by a storage server, a fragmentation index representative of a level of fragmentation that would be introduced to a data set stored at the storage server as a result of performing a deduplication operation on the data set, wherein the fragmentation index is a ratio of a number of read operations needed to access the data set after the deduplication operation and a number of read operations needed to access an ideal data set;
determining, by the storage server, whether to perform the deduplication operation based on a result of said calculating, the determining including comparing the fragmentation index with a threshold to determine whether to perform the deduplication operation; and performing the deduplication operation based on a result of the comparing.

10. The method of claim 9 further comprising:

determining an address of a donor block for each of a plurality of blocks in the data set that are to be shared in the deduplication operation;

creating an address list that includes an address for each block of the data set after the deduplication operation;

sorting the addresses in the address list in the order they occur on a storage device;

calculating, from the address list, the number of read operations needed to access the data set after the deduplication operation.

11. The method of claim 9, wherein the threshold value represents a maximum acceptable level of fragmentation for the data set.

12. The method of claim 9 further comprising:

performing the deduplication operation in response to determining that the fragmentation index is below the threshold value.

13. The method of claim 9 further comprising:

not performing the deduplication operation in response to determining that the fragmentation index is above the threshold value.

14. The method of claim 9, wherein the threshold value is set based on user input.

15. A storage server comprising:

a processor;

a memory coupled with the processor, the memory storing instructions which when executed by the processor cause the processor to perform a plurality of operations, including:

calculating a level of fragmentation that would be introduced to a data set stored by the storage server as a result of a deduplication operation on the data set; and determining whether to perform the deduplication operation based on a result of said calculating, the determining including:

calculating the number of read operations needed to access the data set after the deduplication operation, calculating the number of read operations needed to access an ideal data set, and calculating a fragmentation index representative of the level of fragmentation based on the number of read operations needed to access the data set after the deduplication and the number of read operations needed to access the ideal data set.

16. The storage server of claim 15, wherein the operations further include comparing the level of fragmentation with a threshold value to determine whether to perform the deduplication operation.

17. The storage system of claim 16, wherein the threshold value represents a maximum acceptable level of fragmentation for the data set.

18. The storage system of claim 16, wherein the operations further include:

performing the deduplication operation in response to determining that the level of fragmentation is below the threshold value.

19. The storage system of claim 16, wherein the operations further include:

not performing the deduplication operation in response to determining that the level of fragmentation is above the threshold value.

20. The storage server of claim 16, wherein the threshold value is set based on user input.

21. The storage server of claim 15, wherein the fragmentation index is a ratio of the number of read operations to access the data set after the deduplication operation and the number of read operations needed to access the ideal data set.

22. The storage system of claim 15, wherein calculating the number of read operations needed to access the data set after the deduplication operation includes:

determining an address of a donor block for each of a plurality of blocks in the data set that are to be shared in the deduplication operation;

creating an address list that includes an address for each block of the data set after the deduplication operation;

sorting the addresses in the address list in the order they occur on a storage device;

calculating, from the address list, the number of read operations needed to access the data set after the deduplication operation.

\* \* \* \* \*